United States Patent Office.

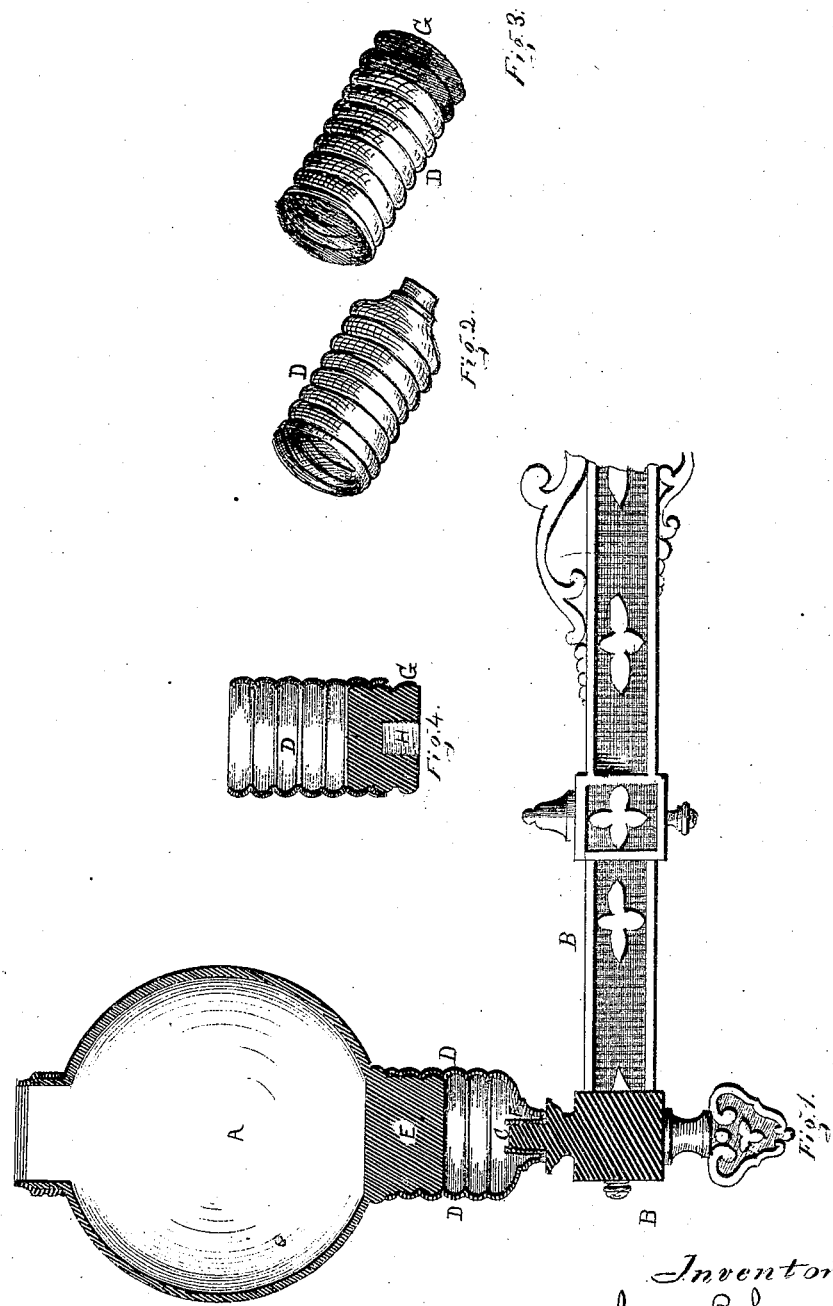

GEORGE BOHNER, OF CHICAGO, ILLINOIS.

Letters Patent No. 109,864, dated December 6, 1870.

IMPROVEMENT IN ATTACHING LAMP-FOUNTS TO BRACKETS, CHANDELIERS, &c.

The Schedule referred to in these Letters Patent and making part of the same.

*To all whom it may concern:*

Be it known that I, GEORGE BOHNER, of Chicago, in the county of Cook and State of Illinois, have invented a new and useful Method of Attaching Lamp-Founts to Brackets, Chandeliers, &c.; and I do hereby declare the following to be a full, clear, and exact description thereof, which will enable others skilled in the art to which my invention appertains to make and use the same, reference being had to the accompanying drawing forming part of this specification.

Figure 1 is a vertical section of a lamp-fount or reservoir attached to a bracket.

Figure 2 is a perspective view of the device for attaching the fount to the bracket.

Figure 3 is a similar view of a modification.

Figure 4 is a longitudinal section of fig. 3.

Similar letters of reference indicate corresponding parts in the several figures of the drawing.

Lamp-founts have heretofore been attached to brackets by means of a screw-ferrule adapted to screw upon a short metallic projection cast upon the end of a bracket, and a similar projection or stem formed upon the under side of a lamp-fount. By this method, however, founts cannot be attached to old brackets, but the latter must be specially constructed for the purpose.

My invention has for its object to provide simple and economical means for attaching a lamp-fount to old brackets or chandeliers, or those of ordinary construction, so that persons desirous of attaching founts to brackets already in use shall not be compelled to incur the additional expense of new brackets; to this end, The invention consists in constructing the screw-ferrule in such a manner that, while it receives the projection upon the lamp-fount, it shall also be capable of screwing directly upon the ends of brackets and chandeliers of ordinary construction, or upon a short nut or block adapted to fit both the ferrule and the end of the bracket.

In the accompanying drawing—

A is a lamp-fount or reservoir; and

B, the arm of a bracket or chandelier, provided with the screw-pin or projection C upon its outer end in the ordinary manner.

D is a short metallic ferrule, provided with a spun or other screw-thread, to receive in its upper end the short screw-shank E formed upon the base of the lamp, and drawn in or contracted at its lower end to form a small interior socket, F, adapted to screw firmly upon the screw-pin C of the bracket.

If desired, the socket F may be formed upon the exterior in prolongation of the ferrule, as shown in fig. 2, or entirely dispensed with, and a slight filling placed within the contracted end of the ferrule around the pin C.

In figs. 3 and 4 the screw-ferrule is shown cylindrical in form, and adapted to receive at its lower end a short recessed nut or block, G, of metal or other proper material.

The nut is attached to the ferrule by a screw-connection, and its recess H is provided with a female-screw thread, by which the nut is secured to the bracket-pin C, as will be readily understood.

The nut may be made with an opening extending entirely through it, instead of a recess, if found preferable.

By my invention a medium of connection is formed between a lamp-fount and a bracket or chandelier without constructing the latter specially for the purpose. Founts can, therefore, be easily applied to brackets at but trifling expense.

I do not claim the cylindrical screw-sockets shown in figs. 3 and 4, as they are not of my invention; but What I do claim, and desire to secure by Letters Patent, is—

1. A screw-ferrule, constructed in such a manner as to connect a lamp-fount or reservoir to an ordinary bracket or chandelier, substantially as herein described, for the purpose specified.

2. The metallic screw-ferrule D, constructed as described, with one end contracted to fit upon the ordinary screw-pin of a lamp-bracket or chandelier, for the purpose specified.

3. The nut or block G, constructed as described, to connect the cylindrical lamp-ferrule to the screw-pin of a lamp-bracket or chandelier, as herein set forth, for the purpose specified.

GEORGE BOHNER.

Witnesses:
E. ANDY. WALKUP,
J. SANDMAN.